United States Patent [19]

Tanahashi et al.

[11] Patent Number: 4,787,981

[45] Date of Patent: Nov. 29, 1988

[54] PROCESS FOR PURIFICATION OF CRUDE GLYCERIDE OIL COMPOSITIONS

[75] Inventors: Seiichi Tanahashi; Kaoru Nagano; Masaaki Kasai; Fujihiko Tsubone, all of Aichi; Akio Iwama, Osaka; Yoshitaka Kazuse, Osaka; Kentaro Tasaka, Osaka; Yutaka Isooka, Osaka, all of Japan

[73] Assignees: Pinoru Oil Mills Co., Tokyo; Nitto Electric Industrial Co., Ltd., Osaka, both of Japan

[21] Appl. No.: 928,585

[22] Filed: Nov. 10, 1986

Related U.S. Application Data

[63] Continuation of Ser. No. 695,134, Jan. 25, 1985, abandoned, which is a continuation of Ser. No. 493,190, May 10, 1983, abandoned.

[30] Foreign Application Priority Data

May 10, 1982 [JP] Japan ................................ 58-77748

[51] Int. Cl.⁴ .............................................. B01D 13/00

[52] U.S. Cl. ................................... 210/639; 210/651; 210/669; 260/424; 260/428.5; 426/417

[58] Field of Search ............... 210/638, 639, 649, 650, 210/651, 654, 669, 806; 260/403, 428, 428.5, 424; 426/417, 490, 662

[56] References Cited

U.S. PATENT DOCUMENTS

| | | | |
|---|---|---|---|
| 4,062,882 | 12/1977 | Sen Gupta | 210/651 X |
| 4,093,540 | 6/1978 | Sen Gupta | 210/638 X |
| 4,240,914 | 12/1980 | Iwama et al. | 210/500.2 |
| 4,385,084 | 5/1983 | Iwama et al. | 427/244 |
| 4,410,568 | 10/1983 | Iwama et al. | 427/244 |
| 4,414,157 | 11/1983 | Iwama et al. | 260/428 X |

FOREIGN PATENT DOCUMENTS

| | | | |
|---|---|---|---|
| 2651761 | 5/1977 | Fed. Rep. of Germany . | |
| 3138498A1 | 6/1982 | Fed. Rep. of Germany . | |
| 50-153010 | 5/1975 | Japan . | |
| 52-84206 | 7/1977 | Japan . | |
| 55-152507 | 11/1980 | Japan . | |
| 2051664A | 1/1981 | United Kingdom . | |
| 2084606 | 4/1982 | United Kingdom | 210/650 |

OTHER PUBLICATIONS

Porter, M. C. et al., "Membrane Ultrafiltration", Chem. Tech., Jan. 1971, pp. 56-63.

Chemical Abstract, vol. 91, No. 7, Aug. 1979, p. 545, No. 54948n.

*Primary Examiner*—Peter Hruskoci

*Attorney, Agent, or Firm*—Sughrue, Mion, Zinn, Macpeak & Seas

[57] ABSTRACT

A process for purification of crude glyceride oil compositions which comprises diluting a crude glyceride oil composition containing gum material and wax as main components of impurities with an organic solvent, bringing the diluted crude glyceride oil composition into contact with a semipermeable membrane composed of polyimide consisting essentially of a repeating unit represented by the general formula:

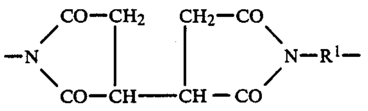

wherein $R^1$ represents a divalent organic group, under pressure to obtain a semipermeable membrane permeable liquid in which the gum material in the glyceride oil after removal of said organic solvent is 100 ppm or less, carrying out bleaching of the glyceride oil obtained from said semipermeable membrane permeable liquid with at least one kind of an adsorbent selected from the group consisting of clay, activated clay, activated carbon and bone black, and then carrying out deodorizing to obtain a purified glyceride oil.

13 Claims, No Drawings

PROCESS FOR PURIFICATION OF CRUDE GLYCERIDE OIL COMPOSITIONS

This is a continuation of application Ser. No. 695,134, filed 1/25/85, now abandoned, which is a continuation of application Ser. No. 493,190, filed 5/10/83, now abandoned.

FIELD OF THE INVENTION

The present invention relates to a process for purification of crude glyceride oil compositions.

BACKGROUND OF THE INVENTION

Vegetable oils usually used as food oils include soybean oil, rapeseed oil, cotton seed oil, safflower oil, corn germ oil, sunflower oil, rice bran oil and the like. In producing such vegetable oils, depending on the amount of oil contained therein, a raw material is pressed or the raw material is extracted with an organic solvent such as hexane to obtain miscella, and then the organic solvent is removed by evaporation from the miscella to yield a crude glyceride oil composition. Such a crude glyceride oil composition generally contains 0.5 to 10% by weight of impurities including phospholipid such as lecithin, etc., as main ingredient, waxes such as higher alcohols, etc., organic sulfur compounds, peptides, free fatty acids, hydrocarbons, carbohydrates, lower aldehydes, lower ketones, sterols, dye compounds and a small amount of metals, etc. These impurities are not desirable on quality of the products, because they cause polymerization or decomposition during preservation or on using or heating to result in oil coloration, generation of unpleasant odors and acceleration of oxidation or deterioration. It is necessary, therefore, to remove the gum materials, waxes and other impurities from the crude oil as much as possible.

Hitherto, in the oil industry, water is added to the crude oil to hydrate the gum material composed mainly of phospholipid, followed by swelling and coagulating the same to degum by centrifugal separation. Since the resulting degummed oil still contains about 0.2 to 1.0% by weight of gum material, it is usually subjected to chemical refining using chemicals such as alkali or acid, etc., to carry out removal of gum material and acid, namely, removal of mainly residual phospholipids and free fatty acids, followed by heating in vacuum together with an adsorbent such as activated clay, etc., to remove colors and other impurities such as heavy metals, free fatty acids, soaps or gum materials, etc., which cannot be removed by the above-described chemical refining. Further, it is generally processed in a dewaxing step for removing waxes and saturated tri- or diglycerides, etc., which crystallize or cause turbidity in the oil at a low temperature. Thereafter, unpleasant odor components such as lower aldehydes, ketones and free fatty acids, etc., are removed in the final step to obtain a purified glyceride oil having a gum content of 50 ppm or less as the final product.

However, the above-described prior purification process requires complicated chemical treatments involving chemical reactions except for the deodorizing step as the final purification step, and further it is desirable to obtain a purified glyceride oil suitable for food that the phospholipid content in the glyceride oil after the treatment for removing acids with alkalis is 100 ppm or less in the bleaching and deodorizing steps. Thus, in the prior art process, it is necessary to carry out repeatedly the gum removal operation. Consequently, not only a large amount of chemicals is required and a considerable amount of glyceride oil is lost, but at least a part of the glyceride oil deteriorates by various chemical treatments for removing gum material and acid to have a harmful influence upon the product glyceride oil and various secondary products obtained therefrom. Further, in order to carry out treatment for drainage which is remarkably polluted as the result of various chemical treatments or treatment for foots formed in the deacidification step, chemicals, equipment and expense are additionally required.

In order to remove such disadvantages, a novel process for purification of crude glyceride oil compositions was proposed in Japanese Patent Application (OPI) No. 153010/75 (the term "OPI" as used herein refers to a "published unexamined Japanese patent application"). In accordance with this process, after a crude glyceride oil composition is diluted with an organic solvent such as hexane, etc., it is brought into contact with an ultrafiltration membrane made of polysulfone, polyacrylonitrile or polyamide under pressure and the organic solvent is removed from a membrane permeable solution to obtain a degummed oil. However, according to this process, a removal rate to phospholipids in the crude glyceride oil composition is not sufficiently high because of characteristics of the ultrafiltration membrane, and, in the case of a crude glyceride oil composition containing several % by weight of gum material, it is difficult to reduce a gum material content in the degummed oil to 100 ppm or less which is the amount capable of effectively purifying so as to use for food by the above-described bleaching and deodorizing steps by one step membrane treatment described above. Thus, as described in Japanese Patent Application (OPI) No. 84206/77, an adsorption treatment using an expensive adsorbent such as alumina or silica is additionally required before or after the membrane treatment for miscella. As the result, technical and commercial advantages of the membrane treatment which is substituted for purification by chemical treatment are remarkably reduced. By the way, in case that the crude glyceride oil composition contains 2% by weight of gum material, the removal rate of the membrane for gum material should be 99.5% or more in order to reduce the gum material content in the resulting degummed oil to 100 ppm or less.

Further, in any of the above-described processes, since the ultrafiltration membrane used does not have sufficiently high resistance to glyceride oils and organic solvents for dilution and it easily softens at an elevated temperature, the molecular weight cut-off varies and removal ability for gum material is lost. Therefore, it is desirable that the membrane treatment is generally carried out at a comparatively low temperature of 10° to 20° C. As the result, since miscella having a comparatively high viscosity is subjected to membrane treatment, the amount of the permeable liquid is small and the treatment requires a long period of time. It is not preferred to reduce the glyceride concentration in the miscella, because the amount to be treated becomes large, though the viscosity reduces to increase the amount of the permeable liquid.

SUMMARY OF THE INVENTION

As a result of earnest studies to overcome the above-described various problems in purification of crude glyceride oil compositions by the membrane treatment, it has been found that a degummed oil having a gum material concentration of 100 ppm or less can be obtained by the process which comprises diluting a crude glyceride oil composition containing glyceride oil and phospholipid and wax as main impurities with, preferably, an organic solvent, carrying out membrane treatment using a semipermeable membrane of polyimide having a specified structural unit to obtain a permeable liquid in a large amount, from which the phospholipid is removed at a removal rate of 99.5% or more, and removing the organic solvent from the permeable liquid, and, consequently, purified glyceride oil having a high quality which is suitable for food oil can be obtained by carrying out bleaching of the resulted degummed oil with an inexpensive adsorbent such as clay or activated clay, etc., and thereafter carrying out deodorizing. Thus, the present invention has been made.

Accordingly, an object of the present invention is to provide a process for obtaining a purified glyceride oil comprising diluting a crude glyceride oil composition containing gum material and wax as main components of impurities with an organic solvent, bringing the diluted crude glyceride oil composition under pressure into contact with a semipermeable membrane composed of polyimide consisting essentially of a repeating unit represented by the general formula:

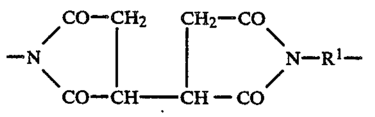

wherein $R^1$ represents a divalent organic group, to obtain a semipermeable membrane permeable liquid in which the gum material in the glyceride oil after removal of the organic solvent is 100 ppm or less, carrying out bleaching of the glyceride oil obtained from the semipermeable membrane permeable liquid with at least one kind of adsorbent selected from clay, activated clay, activated carbon and bone black, and carrying out deodorizing to obtain a purified glyceride oil.

DETAILED DESCRIPTION OF THE INVENTION

The semipermeable membranes composed of the above-described polyimide suitably used in the present invention have been described in U.S. Pat. No. 4,240,914. In the present invention, a semipermeable membrane comprising a polyimide represented by the above-described general formula wherein $R^1$ is represented by the general formula:

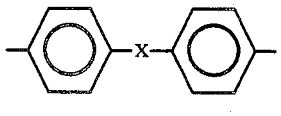

wherein X represents a divelent linking group, is preferably used.

Examples of X include $-CH_2-$, $-C(CH_3)_2-$, $-O-$, $-SO_2-$, etc. In particular, polyimides wherein X is $-CH_2-$ or $-O-$, which have a constant molecular weight cut-off over a long period of time even when bringing into contact with crude glyceride oil compositions heated to high temperatures, are preferred.

The present invention can used polyimides consisting essentially of the above-described repeating unit which have an imidation rate defined as $$\frac{\text{Number of imide rings}}{\text{Number of imide rings} + \text{Number of amide acid bonds}}$$

of about 70% or more, preferably 90% or more, and most preferably 98 to 100%. Further, the inherent viscosity of the polyimides (measured at 30° C. in N-methyl-2-pyrrolidone solution) is 0.55 to 1.00, preferably 0.6 to 0.85, and a number average molecular weight thereof is 20,000 to 120,000, preferably 30,000 to 80,000.

The process for producing semipermeable membranes having an anisotropic structure such as an ultrafiltration membrane or a reverse osmosis membrane, etc., consisting of the above-described general formula has been disclosed in Japanese Patent Application (OPI) Nos. 71785/79 and 94477/79. However, in the process of the present invention, it is preferred to use a semipermeable membrane produced by the process which comprises dissolving the above described polyimide and a swelling agent represented by the general formula:

$$R^3O\text{-}(CH_2CHR^2O)_{\overline{n}}R^4$$

wherein $R^2$, $R^3$ and $R^4$ each represents a hydrogen, a methyl group or an ethyl group, and n represents an integer of 1 to 5 where $R^2$ is a hydrogen and an integer of 1 to 3 where $R^2$ is a methyl group or an ethyl group, in an organic solvent (hereinafter referred to as dope solvent) compatible with a coagulation solvent such as water, etc., to prepare a dope, applying the resulting dope to a suitable support, dipping it in a coagulation solvent which does not dissolve the above-described polyimide but dissolves the swelling agent and is compatible with the above-described dope solvent, and coagulating the above-described polyimide to form a membrane, as described in Japanese Patent Application (OPI) No. 152507/80.

In the above-described swelling agent, n is preferably an integer of 2 or 3 where $R^2$ is a hydrogen, and n is preferably an integer of 1 or 2 where $R^2$ is a methyl group or an ethyl group. Accordingly, examples of the swelling agent include (poly)ethylene glycols and methyl or ethyl derivatives thereof such as ethylene glycol, diethylene glycol, triethylene glycol, ethylene glycol monomethyl ether, ethylene glycol monoethyl ether, ethylene glycol dimethyl ether, diethylene glycol monomethyl ether, diethylene glycol dimethyl ether, triethylene glycol monomethyl ether, etc. Further, examples of the dope solvent include N-methyl-2-pyrrolidone, N-ethyl-2-pyrrolidone, N-methyl-2-piperidone, dimethylformamide, dimethylacetamide, dimethyl sulfoxide, tetramethyl urea, sulforan, etc.

Further, as the coagulation solvent, water is generally used, but solvents which are compatible with the dope solvent and dissolve the swelling agent but coagulate the above-described polyimide may be used. For example, mixed solvents of at least one of methanol, ethanol, acetone, ethylene glycol, diethylene glycol and diethylene glycol monomethyl ether and water can be used. Of course, these can be used alone as the coagulation solvent.

Since the process for producing semipermeable membranes from a dope containing the polyimide and the swelling agent has been described in the above-described Japanese OPI references, the details thereof are omitted. It is preferred that the amount of the polyethylene glycol or ether derivatives thereof represented by the above-described general formula used is 30 to 300 parts by weight, preferably 50 to 200 parts by weight, based on 100 parts by weight of the polyimide, and the concentration of the polyimide in the dope is 5 to 30 parts by weight.

The semipermeable membranes composed of the polyimide used in the present invention usually have a molecular weight cut-off of 10,000 to 100,000, preferably 10,000 to 30,000, and semipermeable membranes called ultrafiltration membranes are generally preferred to use. When the molecular weight cut-off value is too small, the amount of the permeable liquid tends to be decreased. On the other hand, when this value is too high, the gum material separating ability tends to be poor.

The molecular weight cut-off can be determined by measuring the removal rate of the semipermeable membrane to a solute having a known molecular weight. Practically, it is preferred to measure the removal rate of the semipermeable membrane using a toluene solution of polyethylene glycol having a known average molecular weight and a monodisperse molecular weight distribution as a solute (concentration: 5,000 ppm). In the invention, therefore, the removal rate of the membrane is measured using toluene solutions of polyethylene glycols having different average molecular weights at a temperature of 25° C. and a pressure of 3 kg/cm$^2$, and the minimum molecular weight of the polyethylene glycol having a removal rate of at least 95% is determined to be the molecular weight cut-off of the membrane.

Lecithin which is a typical component of phospholipids has a molecular weight nearly equal to that of triglyceride. At the membrane treatment conditions of the present invention, however, several ten to several hundred lecithin molecules associate together to form miscelle. Therefore, by bringing into contact with a semipermeable membrane having a molecular weight cut-off in the above-described range, phospholipid is almost completely removed by the membrane, whereby a degummed oil having a phospholipid concentration of 100 ppm or less can be obtained.

In the present invention, organic solvents, preferably, are used in order to accelerate miscelle formation of phospholipid while at the same time diluting the crude glyceride oil composition. Such organic solvents are required to have a property of not dissolving the above-described polyimide semipermeable membrane. The molecular weight thereof is preferably smaller than that of the glyceride oil and is usually 50 to 200, preferably 60 to 150. Examples of the organic solvents include aliphatic hydrocarbons such as pentane, hexane, heptane, octane, etc., alicyclic hydrocarbons such as cyclopropane, cyclopentane, cyclohexane, cycloheptane, etc., aromatic hydrocarbons such as benzene, toluene, xylene, etc., aliphatic ketones such as acetone, methyl ethyl ketone, etc., and lower fatty acid esters such as ethyl acetate, butyl acetate, etc., which can be used alone or as a mixture of two or more of them. Aliphatic hydrocarbons such as hexane are preferably used.

The miscella prepared by diluting the crude glyceride oil composition with the organic solvent usually contains 10 to 90% by weight, preferably 20 to 50% by weight of glyceride oil, but it is not limited thereto. Further, the crude glyceride oil composition can be directly subjected to the membrane treatment without diluting with the organic solvent.

Depending on the type of oil seed, the crude glyceride oil composition can be extracted directly from the oil seed with the organic solvent. In the present invention, the thus-extracted liquid may be subjected to the membrane treatment as such. The term "extraction" is construed to be the same as the dilution with the organic solvent. In addition, glyceride oil compositions obtained by distilling away the solvent after the solvent extraction by the prior purification process can be used as the crude glyceride oil compositions in the present invention, and, of course, compositions obtained by pressing an oil seed can be used as the crude glyceride oil. Furthermore, if desired, gum material-containing glyceride oil obtained at any desired stage of the prior purification process can be used as the crude glyceride oil. The term "miscella" is used hereinafter to refer to a solution of the crude glyceride oil composition in the organic solvent, as described above.

In the present invention, the miscella of the crude glyceride oil composition, namely, the solution of the crude glyceride oil composition in the organic solvent is then brought into contact with the polyimide semipermeable membrane under pressure at a temperature at which evaporation of the organic solvent is not significant, which is usually from 0° C. to 150° C., preferably from 0° C. to 100° C. and most preferably 0° C. to 80° C. Generally, by raising the treatment temperature, the amount of the permeable liquid processed can be increased. In the present invention, even if the membrane treatment is carried out at a higher temperature, the polyimide semipermeable membrane maintains its molecular weight cut-off at a substantially constant level, and thus the membrane permeable liquid contains substantially no phospholipid.

At a temperature lower than 0° C., however, the amount of the permeable liquid is too small from a practical viewpoint. On the other hand, the treatment temperature is too high, there is the danger that the miscelle composed mainly of phospholipid is thermally decomposed and cannot be effectively removed by the membrane.

Further, in carrying out membrane treatment, the miscella of the crude glyceride oil composition is brought into contact with a semipermeable membrane under a pressure of 0.1 to 50 kg/cm$^2$ (gauge pressure; hereinafter, all are the same) depending on the shape of the semipermeable membrane used. For example, in case of using a capillary semipermeable membrane having an inner diameter of about 0.1 to 2 mm, it is pressured at a pressure of 0.1 to 8 kg/cm$^2$, preferably 0.3 to 5 kg/cm$^2$, and in case of using a tubular semipermeable membrane wherein a semipermeable membrane is formed on the inside of the porous support tube having an inner diameter of about 2 to 50 mm, it is pressurized at a pressure of 2 to 50 kg/cm$^2$, preferably 5 to 20 kg/cm$^2$. Generally, when the pressure is too low, the permeation rate of the glyceride oil is low, though it depends upon the shape of the membrane. On the other hand, when the pressure is too high, the membrane is easily compacted or damaged.

Further, in the present invention, it is preferred that the miscella of the crude glyceride oil composition is brought into contact under pressure with the semipermeable membrane under the above-described conditions with continuously circulating it till at least 50%, preferably 66 to 98%, of the purified glyceride oil based on the crude glyceride oil composition is recovered as a membrane permeable liquid. If necessary, the organic solvent is added to the miscella to supplement the permeated one. Concerning the flow rate of the miscella of the crude glyceride oil composition to the membrane face, it is preferred that the linear velocity to the membrane face is 0.1 to 8 m/second, preferably 0.5 to 3 m/second. For example, in the process of the present invention, the miscella of the crude glyceride oil composition is continuously circulated through a tubular semipermeable membrane by means of a pump, etc. In this case, when the linear velocity parallel to the membrane face of the miscella of the crude glyceride oil composition is too low, the concentration polarization of impermeable components such as phospholipid, etc., on the membrane face becomes great, by which permeation of the glyceride oil is prevented, and when it is too large, energy efficiency of the pump deteriorates.

The process of the present invention is suitable for the refining of crude vegetable glyceride oil compositions containing a large amount of phospholipid such as lecithin, and, in addition, it can be applied to the refining of crude animal glyceride oil compositions. Further, since lecithin, etc., are useful and valuable materials, they can be recovered, if necessary, from the membrane impermeable liquid. Usually, after the membrane impermeable liquid is diluted again with the organic solvent such as hexane, etc., and subjected to membrane treatment according to the present invention, the organic solvent is removed from the membrane impermeable liquid, by which phospholipid having a high purity can be obtained.

From the ultrafiltration treated miscella as described above, the organic solvent is then removed by distillation or other means. The removal of the solvent from such degummed miscella is carried out by the same method as that of the prior art. The degummed oil subjected to the membrane treatment by the process of the present invention has a residual gum material content of 100 ppm or less and, in preferable case, 50 ppm or less. At the same time, waxes in the composition are substantially removed, when the membrane treatment temperature of the crude glyceride oil composition is in a range of 0° to 80° C. Such dewaxing of the crude glyceride oil composition by the membrane treatment according to the present invention can be effectively carried out not only for cotton seed oil, safflower oil, corn germ oil, rice bran oil, etc., which contain a large amount of waxes but also for soybean oil and rapeseed, etc., which are difficult to remove waxes by the prior methods because of containing waxes in a small amount. Consequently, according to the present invention, since the degumming and dewaxing can be carried out at the same time by the membrane treatment of the crude glyceride oil composition at a temperature range of 0° to 80° C. regardless of the amount of waxes, the dewaxing step which is the essential step in the prior purification process can be abridged. Therefore, much energy required hitherto for the dewaxing step comprising cooling and filtration of the glyceride oil composition is not required and the loss of glyceride oil accompanying to dewaxing can be prevented.

According to the present invention, the degummed and dewaxed glyceride oil obtained as described above is subjected to bleaching and deodorizing as described hereinafter, by which a highly purified glyceride oil suitable for the food oil can be obtained.

In order to carry out bleaching of the degummed oil in the present invention, at least one kind of adsorbent selected from finely-divided clay, activated clay, activated carbon and bone black, which are used for bleaching of the conventional chemically refined oil, can be used. The adsorption treatment is carried out by dispersing the adsorbent in the degummed oil and heating to a temperature of 80° to 120° C. for 5 to 60 minutes with stirring under a reduced pressure of 1 to 200 mm Hg abs. The amount of the above-described adsorbent used in the present invention is in a range of 0.01 to 5% by weight, preferably 0.1 to 2% by weight, based on the weight of the degummed oil.

Of course, the bleaching of the degummed oil by adsorption can be carried out by passing the degummed oil through a column packed with the adsorbent. Further, in this adsorption treatment, not only colors but also impurities remaining in a small amount in the degummed oil can be removed.

Furthermore, in order to improve the quality of the purified oil, in the present invention, acid treatment can be carried out before the adsorption treatment by adding organic acids, inorganic acids or metal salts thereof which are permitted to use as food additives. Examples of organic acids include citric acid, oxalic acid, acetic acid, glacial acetic acid, etc., and examples of inorganic acids include phosphoric acid, sodium phosphate, sodium polyphosphate, sulfuric acid, etc. A suitable amount thereof is 0.001 to 0.5% by weight, preferably 0.005 to 0.05% by weight, based on the weight of the degummed oil.

From the glyceride oil after the adsorption treatment, the adsorbents are separated and removed by usually a pressure filtration method. The above-described acids added, if necessary, to the degummed oil are simultaneously removed in this step by adsorbing onto the adsorbent.

The bleaching oil is then subjected to deodorizing. The deodorizing is usually carried out by stripping the glyceride oil with sparge steam in an amount of 2 to 20% by weight based on the weight of the glyceride oil at a temperature of 240° to 270° C. under a reduced pressure of 1 to 10 mm Hg abs. This deodorizing may be the same as that applied to the conventional chemically treated degummed oils.

According to the process of the present invention, when the crude glyceride oil composition containing several % of phospholipids and waxes is diluted with the organic solvent and subjected to only the one-step membrane treatment with the semipermeable membrane composed of polyimide, as described above, it is possible to obtain a degummed oil containing 100 ppm or less of phospholipids and waxes by removing the organic solvent. Accordingly, when it is bleached with an inexpensive adsorbent such as clay or activated clay, etc., and further subjected to the deodorizing, it can be highly purified and a purified glyceride oil capable of using directly for food can be obtained. Namely, according to the present invention, highly purified glyceride oil capable of using for food can be obtained by only the physical treatment, namely, membrane treatment, without requiring multistage chemical treatment, and at the same time, the yield of the purified glyceride oil is increased. Moreover, foots and drainages containing a large amount of chemicals are not produced.

Furthermore, according to the membrane treatment using the polyimide semipermeable membrane of the present invention, impurities having a comparatively low molecular weight such as saccharoses and amino acids, etc., are embedded inside of the miscella of the phospholipid are removed by the membrane, by which purified glyceride oil having a remarkably high quality can be obtained.

In the following, the present invention is illustrated by reference to Reference Example and Examples.

REFERENCE EXAMPLE

Production of Polyimide Ultrafiltration Membrane

To an N-methyl-2-pyrrolidone solution containing 28% by weight of polyimide having an imidation rate of 99% or more and an inherent viscosity (η) of 0.73 which had the above-described general formula wherein $R^1$ was

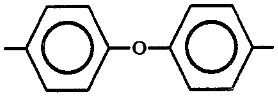

100 parts by weight of diethylene glycol based on 100 parts by weight of polyimide were added as a swelling agent to prepare a homogeneous dope. This dope was applied to the inside of a glass tube by cast coating, and the glass tube is put into water of 5° C. at once and immersed for 5 hours to obtain a tubular ultrafiltration membrane having an inner diameter of 12 mm, a thickness of 200 μm and a molecular weight cut-off of 20,000.

The module equipped with this membrane was attached to the liquid passage line for the miscella of crude soybean oil composition as described in the following.

EXAMPLE 1

A 27 wt% hexane miscella of crude soybean oil containing 2.18% by weight (based on the weight of soybean oil) of phospholipid, as the crude glyceride oil composition, was subjected to ultrafiltration treatment by passing through the above-described membrane module in circulation under conditions of a pressure of 3 kg/cm$^2$, a temperature of 40° C. and a flow rate of 14 l/minute. From the resulting membrane permeable liquid, hexane was distilled away to obtain an ultrafiltration treated oil.

25 tons of this oil were heated to about 85° C. A 75% phosphoric acid solution was added to the ultrafiltration treated oil in an amount of 0.05% by weight based on the weight of the oil to carry out acid treatment by stirring. Then, this ultrafiltration treated oil was additionally heated to 110° C., and activated clay was added in an amount of 0.8% by weight based on the weight of the treated oil. After stirred for 30 minutes under 110 mm Hg, activated clay was filtered off by a filter press to obtain a bleaching oil. This bleaching oil was then heated to 260° C., and deodorizing was carried out by stripping with sparge steam in an amount of 4.5% by weight based on the bleaching oil under 4 mm Hg abs for 85 minutes to obtain 20 tons of a purified soybean oil. The resulting purified soybean oil was preserved for 3 months in an outdoor storage tank, and a preservation test was carried out.

Properties of the crude soybean oil used for the membrane treatment, the ultrafiltration treated oil, the bleaching oil and the purified oil obtained as described above are shown in Table 1. For comparison, properties of a purified soybean oil which was obtained by degumming by the conventional chemical process and, thereafter, carrying out alkali refining, bleaching, dewaxing and deodorizing are also shown in Table 1.

According to the process of the present invention, an ultrafiltration treated oil having a phospholipid content of only 25 ppm was firstly obtained by the membrane treatment and, thereafter, an edible soybean oil which was not different from the purified soybean oils obtained by the conventional chemical process could be obtained by carrying out acid treatment, bleaching and deodorizing of the ultrafiltration treated oil. Moreover, according to the process of the present invention, as is clear from the results of cooling test, the dewaxing was effectively carried out by only the membrane treatment as compared with the conventional chemical refining process.

Likewise, results of the preservation test of the purified oil according to the process of the present invention and the purified oil according to the conventional chemical process are shown in Tables 2 and 3, respectively.

(Note) Methods of measurement in analysis column in each table are as follows.

Acid Value: By a standard of the analytical method described in *Journal of Chemistry Society* (JOCS) (1971)

Color: Lovibond colorimetry by a standard of the analytical method (JOCS, 1971). A 1 inch cell is used for crude soybean oil and ultrafiltration treated oil, and a 5¼ inch cell is used for bleaching oil and purified soybean oil.

Chlorophyll: By a standard of the analytical method (JOCS, 1971)

Phospholipid: Lorentz method of the analytical method (JOCS, 1971)

Peroxide Value: By a standard of the analytical method (JOCS, 1971)

Flavor: By an organoleptic test. Standards of evaluation are as follows.

5.0 Fresh and mild taste, which is satisfactory for food.
4.0 Normal taste for food.
3.0 Unpleasant odor is felt, and taste is not good.
2.0 Somewhat unfittable for food. It is nearly a boundary for food.
1.0 Bad taste, which is unfittable for food.

Odor by Heating: After heated to 120° C., the odor is examined by an organoleptic test. Standards of evaluation are as follows.

A: It is odorless or has an inherent odor and does not have an unpleasant odor. (good)
B: It has an unpleasant odor but can be used. (common)
C: It has a strong unpleasant odor and is not fittable for food.

Color by Heating: After allowed to stand in a thermostat at 105° C. for 6 hours, the color is measured by Lovibond colorimetry (using a 5¼ cell).

Exposure Test: After fluorescent light is applied at 7,000 luxes for 4 hours, POV and odor by heating are measured.

AOM Test (6 hour value): By a standard of the analytical method (JOCS, 1971), but by a handy method for measuring a POV after the passage of 6 hours.

Cold Test: The time at which crystals or white cloudiness are formed is measured by a standard of the analytical method (JOCS, 1971).

EXAMPLE 2

25 tons of ultrafiltration treated oil were subjected to bleaching and deodorizing in the same manner as in Example 1 except that acid treatment was not carried out and activated clay was used in an amount of 1.2% by weight based on the weight of the ultrafiltration treated oil, to obtain 20 tons of purified soybean oil.

Properties of the resulting purified soybean oil and those after preserved by the same manner as in Example 1 are shown in Tables 4 and 5.

EXAMPLE 3

A 25 wt% hexane miscella of a crude rapeseed oil containing 2.29% by weight (based on the weight of rapeseed oil) of phospholipid, which was a crude glyceride oil composition, was subjected to ultrafiltration treatment by circulating and passing through the above-described membrane module under the same conditions as in Example 1. From the resulting membrane permeable liquid, hexane was distilled away to obtain about 30 tons of an ultrafiltration treated oil.

This treated oil was heated to about 85° C., and a 75% phosphoric acid solution was added in an amount of 0.05% by weight based on the weight of the treated oil to carry out acid treatment by stirring. This ultrafiltration treated oil was then further heated to 110° C., and activated clay was added in an amount of 1.2% by weight based on the weight of the treated oil. After stirred for 30 minutes under 110 mm Hg abs, the activated clay was filtered out by a filter press to obtain a bleaching oil. Thereafter, the resulting bleaching oil was heated to 260° C., and deodorizing was carried out by stripping with sparge steam in an amount of 4.5% by weight based on the weight of the bleaching oil under 4 mm Hg abs for 85 minutes to obtain about 25 tons of a purified rapeseed oil. The resulting purified rapeseed oil was preserved for 3 months in an outdoor storage tank, and a preservation test was carried out.

Properties of the crude rapeseed oil used for the membrane treatment, the ultrafiltration treated oil, the bleaching oil and the purified oil obtained as described above are shown in Table 6. For comparison, properties of a purified rapeseed oil which was obtained by degumming by the conventional chemical process and, thereafter, carrying out alkali refining, bleaching, dewaxing and deodorizing are also shown in Table 6.

Further, a preservation test of the purified oil according to the process of the present invention and the purified oil according to the conventional chemical process was carried out by the same manner as in Example 1. The results are shown in Tables 7 and 8, respectively.

According to the present invention, a rapeseed oil having a phospholipid content of only 31 ppm was firstly obtained by the membrane treatment and, thereafter, a purified rapeseed oil which was superior to that prepared by the conventional chemical refining process could be obtained by carrying out acid treatment, bleaching and deodorizing. Further, according to the process of the present invention, as is clear from the results of a cooling test, dewaxing was effectively carried out by only the ultrafiltration treatment as compared with that by the conventional refining process.

EXAMPLE 4

The object of this example was to recover lecithin.

700 l of a phospholipid concentrated liquid (miscella concentration: 29.2% by weight, and phospholipid concentration: 2.20% by weight), which was a membrane impermeable liquid obtained in Example 1, was further concentrated by circulating and passing through the same membrane module as in Example 1 to obtain 75 l of a concentrated liquid.

Then, 75 l of commercial hexane was added to the concentrated liquid, and concentration was further continued to obtain 35 l of a concentrated liquid. 35 l of commercial hexane was added again, and concentration was carried out to finally obtain 20 l of a concentrated liquid having a miscella concentration of 31.0% by weight. From this concentrated liquid, hexane was removed by thin film vacuum distillation to obtain a high concentration phospholipid mixture shown in Table 9.

TABLE 1

| Analysis | Acid Value | Color | Chlorophyll | Phospholipid | Peroxide Value | Flavor Score | Odor by Heating | Exposure Test: Color by Heating | Exposure Test: POV | Exposure Test: Odor by Heating | AOM | Cold Test |
|---|---|---|---|---|---|---|---|---|---|---|---|---|
| Crude soybean oil | 1.82 | Y35-R3.5 | — | (2.1) | — | — | — | — | — | — | — | — |
| Ultrafiltration treated oil | 0.95 | Y34-R3.4 | 0.412 | 25.40 | — | — | — | — | — | — | — | — |
| Bleached oil | 1.05 | Y27-R2.6 | 0.001 | 23.05 | — | — | — | — | — | — | — | — |
| Purified oil | 0.03 | Y4-R0.5 | 0 | 21.08 | 0 | 5.0 | A | Y10-R1.0 | 0.28 | A | 2.10 | 60 hours or more |
| Comparative purified oil | 0.03 | Y4-R0.4 | 0 | 24.38 | 0 | 5.0 | A | Y9-R0.9 | 0.64 | A' | 1.80 | 25 |

*The unit of the phospholipid content is % by weight in only the case of crude soybean oil, and the others are ppm.

TABLE 2

(Purified Oil of the Present Invention)

| Days Elapsed | Acid Value | Color | Peroxide Value | Flavor Score | Odor by Heating | Exposure Test: Color by Heating | Exposure Test: POV | Exposure Test: Odor by Heating | AOM |
|---|---|---|---|---|---|---|---|---|---|
| 0 | 0.03 | Y4-R0.5 | 0 | 5.0 | A | Y10-R1.0 | 0.28 | A | 2.10 |
| 15 | 0.04 | Y4-R0.5 | 0 | 4.5 | A | Y10-R1.0 | 0.55 | A' | 2.20 |
| 30 | 0.04 | Y5-R0.5 | 0 | 4.5 | A | Y11-R1.2 | 0.65 | A' | 2.40 |
| 45 | 0.04 | Y5-R0.5 | 0.05 | 4.5 | A | Y12-R1.2 | 0.70 | A' | 2.60 |
| 60 | 0.04 | Y5-R0.5 | 0.07 | 4.0 | A | Y12-R1.3 | 0.80 | A' | 2.80 |
| 75 | 0.04 | Y5-R0.6 | 0.11 | 3.5 | A' | Y15-R1.5 | 0.80 | A' | 3.35 |

TABLE 2-continued (Purified Oil of the Present Invention)

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 90 | 0.04 | Y5-R0.6 | 0.15 | 3.5 | A' | Y16-R1.7 | 0.90 | A' | 5.10 |

TABLE 3

(Purified Oil of Comparative Example)

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 0 | 0.03 | Y4-R0.4 | 0 | 5.0 | A | Y9-R0.9 | 0.64 | A | 1.80 |
| 15 | 0.03 | Y4-R0.4 | 0 | 4.5 | A | Y10-R1.0 | 0.66 | A' | 2.20 |
| 30 | 0.04 | Y4-R0.4 | 0 | 4.5 | A | Y12-R1.3 | 0.73 | A' | 2.80 |
| 45 | 0.04 | Y4-R0.4 | 0.17 | 4.0 | A | Y13-R1.3 | 0.76 | A' | 3.80 |
| 60 | 0.04 | Y4-R0.5 | 0.27 | 3.5 | A | Y14-R1.4 | 0.85 | A' | 5.10 |
| 75 | 0.04 | Y5-R0.5 | 0.35 | 3.5 | A' | Y14-R1.4 | 0.96 | A'-B | 6.35 |
| 90 | 0.45 | Y5-R0.5 | 0.45 | 3.5 | A' | Y14-R1.5 | 1.00 | A'-B | 8.50 |

TABLE 4

| Analysis | Acid Value | Color | Chlorophyll | Phospholipid | Peroxide Value | Flavor Score | Odor by Heating | Color by Heating | Exposure Test POV | Exposure Test Odor by Heating | AOM | Cold Test |
|---|---|---|---|---|---|---|---|---|---|---|---|---|
| Ultrafiltration treated oil | 0.95 | Y34-R3.4 | 0.412 | 25.40 | — | — | — | — | — | — | — | — |
| Bleached oil | 0.98 | Y32-R3.3 | 0.008 | 20.78 | — | — | — | — | — | — | — | — |
| Purified oil | 0.04 | Y4-R0.4 | 0.002 | 20.02 | 0 | 4.5 | A | Y10-R0.9 | 0.70 | A' | 1.80 | 60 |

TABLE 5

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 0 | 0.04 | Y4-R0.4 | 0 | 4.5 | A | Y10-R0.9 | 0.70 | A' | 1.80 |
| 15 | 0.04 | Y4-R0.5 | 0 | 4.5 | A | Y10-R1.0 | 0.75 | A' | 2.10 |
| 30 | 0.05 | Y5-R0.5 | 0.07 | 4.0 | A | Y12-R1.2 | 0.77 | A' | 2.55 |
| 45 | 0.05 | Y5-R0.5 | 0.20 | 4.0 | A | Y13-R1.4 | 0.85 | A' | 3.12 |
| 60 | 0.05 | Y5-R0.6 | 0.28 | 3.5 | A' | Y14-R1.5 | 0.89 | A'-B | 4.93 |
| 75 | 0.05 | Y6-R0.6 | 0.40 | 3.5 | A' | Y14-R1.5 | 0.99 | A'-B | 5.76 |
| 90 | 0.06 | Y6-R0.7 | 0.48 | 3.5 | A'-B | Y15-R1.5 | 1.02 | A'-B | 7.28 |

TABLE 6

| Analysis | Acid Value | Color | Chlorophyll | Phospholipid | Peroxide Value | Flavor Score | Odor by Heating | Color by Heating | Exposure Test POV | Exposure Test Odor by Heating | AOM | Cold Test |
|---|---|---|---|---|---|---|---|---|---|---|---|---|
| Crude rapeseed oil | 2.85 | Y58-R5.9-B3.5 | 19.8 | (2.29) | — | — | — | — | — | — | — | — |
| Ultrafiltration treated oil | 1.21 | Y47-R5.8-B2.3 | 15.8 | 31.24 | — | — | — | — | — | — | — | — |
| Bleached oil | 1.32 | Y28-R2.9 | 0.003 | 28.01 | — | — | — | — | — | — | — | — |
| Purified oil | 0.03 | Y3-R0.4 | 0 | 25.59 | 0 | 5.0 | A | Y10-R1.1 | 0.56 | A | 2.45 | 250 |
| Comparative purified oil | 0.03 | Y4-R0.4 | 0 | 23.18 | 0 | 5.0 | A | Y9-R1.0 | 0.70 | A' | 2.20 | 150 |

*The unit of the phospholipid content is % by weight in only the case of crude rapeseed oil, and the others are ppm.

TABLE 7

(Purified Oil of the Present Invention)

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 0 | 0.03 | Y3-R0.4 | 0 | 5.0 | A | Y10-R1.1 | 0.56 | A' | 2.45 |
| 15 | 0.03 | Y4-R0.4 | 0 | 4.5 | A | Y11-R1.1 | 0.62 | A' | 2.61 |
| 30 | 0.04 | Y4-R0.4 | 0.05 | 4.5 | A | Y11-R1.1 | 0.75 | A' | 2.76 |
| 45 | 0.04 | Y4-R0.4 | 0.08 | 4.5 | A | Y12-R1.2 | 0.89 | A' | 2.92 |

TABLE 7-continued (Purified Oil of the Present Invention)

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 60 | 0.04 | Y4-R0.5 | 0.13 | 4.0 | A' | Y12-R1.3 | 0.96 | A' | 3.41 |
| 75 | 0.04 | Y5-R0.5 | 0.15 | 4.0 | A' | Y13-R1.4 | 1.05 | A'-B | 4.26 |
| 90 | 0.04 | Y5-R0.6 | 0.20 | 3.5 | A' | R14-R1.4 | 1.21 | A'-B | 6.81 |

TABLE 8

(Purified Oil of Comparative Example)

| Days Elapsed | Acid Value | Color | Peroxide Value | Flavor Score | Odor by Heating | Color by Heating | Exposure Test POV | Exposure Test Odor by Heating | AOM |
|---|---|---|---|---|---|---|---|---|---|
| 0 | 0.03 | Y4-R0.4 | 0 | 5.0 | A | Y9-R1.0 | 0.70 | A' | 2.20 |
| 15 | 0.03 | Y4-R0.4 | 0 | 4.5 | A | Y10-R1.0 | 0.74 | A' | 2.45 |
| 30 | 0.03 | Y4-R0.4 | 0 | 4.5 | A | Y11-R1.0 | 0.83 | A' | 2.91 |
| 45 | 0.04 | Y4-R0.4 | 0.09 | 4.0 | A' | Y11-R1.2 | 0.90 | A' | 3.88 |
| 60 | 0.04 | Y4-R0.5 | 0.15 | 4.0 | A' | Y12-R1.3 | 0.98 | A'-B | 5.77 |
| 75 | 0.04 | Y5-R0.5 | 0.22 | 3.5 | A' | Y14-R1.4 | 1.10 | A'-B | 7.24 |
| 90 | 0.04 | Y5-R0.5 | 0.31 | 3.5 | A' | Y14-R1.5 | 1.22 | A'-B | 9.18 |

TABLE 9

| | Composition (%) Invention | Food Additive (e.g., lecithin) | Standard |
|---|---|---|---|
| Acetone-soluble material | 16.3 | 35.5 | 40 or less |
| Acetone-insoluble material | 81.1 | 61.2 | — |
| Benzene-insoluble material | 0.21 | 0.06 | 0.3 or less |
| Moisture content | 0.29 | 2.1 | 2.0 or less |
| Acid value | 36.9 | 23.9 | 40 or less |
| Color | Blackish brown | — | Light yellow or brown |

While the invention has been described in detail and with reference to specific embodiments thereof, it will be apparent to one skilled in the art that various changes and modifications can be made therein without departing from the spirit and scope thereof.

What is claimed is:

1. A process for purification of crude glyceride oil compositions comprising:

(A) diluting a crude glyceride oil composition containing gum material and wax as main components of impurities, with an organic solvent, (B) bringing the diluted crude glyceride oil composition into contact with a semipermeable membrane having a molecular weight cut-off value of 10,000–20,000, comprising polyimide consisting essentially of a repeating unit represented by the general formula:

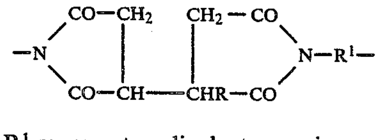

wherein $R^1$ represents a divalent organic group, under pressure to obtain a semipermeable membrane permeable liquid in which the gum material in the glyceride oil after removal of said organic solvent is 100 ppm or less, and subjecting the semipermeable membrane permeable liquid to acid treatment by adding at least one kind of acid or salt thereof selected from the group consisting of oxalic acid, citric acid, acetic acid, glacial acetic acid, phosphoric acid, sodium phosphate, sodium polyphosphate and sulfuric acid, wherein the amount of the acid added is 0.001 to 0.5% by weight based on the weight of the glyceride oil, (C) carrying out bleaching of the glyceride oil obtained from said semipermeable membrane permeable liquid with at least one kind of an adsorbent selected from the group consisting of clay, activated clay, activated carbon and bone black, wherein the adsorption treatment is carried out by dispersing the adsorbant in the degummed oil and heating to a temperature of 80° to 120° C. for five to sixty minutes with stirring under a reduced pressure of 1 to 200 mm Hg abs, and then (D) carrying out deodorizing to obtain a purified glyceride oil wherein the deodorizing is carried out by stripping the glyceride oil with sparge steam in an amount of 2 to 20% by weight based on the weight of the glyceride oil at a temperature of 240° to 270° C. under a reduced pressure of 1 to 10 mm Hg abs, wherein the cut-off value is a minimum molecular weight of a polyethylene glycol having a removal rate of at least 95%, as measured using toluene solutions of polyethylene-glycols having different average molecular weights at a temperature of 25° C. and a pressure of 3 $kg/cm^2$.

2. The process as claimed in claim 1, wherein the organic solvent is selected from the group consisting of hydrocarbons, lower free fatty acid esters, aliphatic ketones, and mixtures thereof and has a molecular weight of 50 to 200.

3. The process as claimed in claim 1, wherein the organic solvent is hexane.

4. The process as claimed in claim 1, wherein contacting the semipermeable membrane is conducted at a temperature of 0° to 100° C.

5. The process as claimed in claim 1, wherein the crude glyceride oil composition is diluted with the organic solvent to adjust the glycerider oil content to 10 to 90% by weight.

6. The process as claimed in claim 1, wherein the amount of the adsorbent used is 0.01 to 5% by weight based on the weight of the glyceride oil.

7. The process as claimed in claim 1, wherein $R^1$ is represented by the general formula:

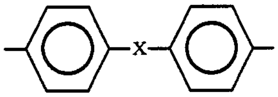

wherein X represents a divalent linking group.

8. The process as claimed in claim 7, wherein X is $—CH_2—$ or —O—.

9. The process as claimed in claim 1, wherein the semipermeable membrane is prepared by dissolving the polyimide and a swelling agent in an organic solvent compatible with a coagulation solvent to prepare a dope, applying the dope to a support, dipping the dope applied support in a coagulation solvent which does not dissolve the polyimide but dissolves the swelling agent and is compatible with the organic solvent and coagulating the polyimide.

10. The process as claimed in claim 9, wherein the swelling agent is selected from the group consisting of ethylene glycol, diethylene glycol and triethylene glycol.

11. The process as claimed in claim 1, wherein said polyimide has an imidation rate defined as:

$$\frac{\text{Number of imide rings}}{\text{Number of imide rings} + \text{Number of amide acid bonds}}$$

of about 70% or more.

12. The process as claimed in claim 1, wherein said diluted crude glyceride oil composition is brought into contact with said semipermeable membrane under a pressure of 0.1 to 50 $kg/cm^2$, gauge pressure.

13. The process as claimed in claim 1, wherein said semipermeable membrane has a molecular weight cut-off value of 20,000.

* * * * *

UNITED STATES PATENT AND TRADEMARK OFFICE
CERTIFICATE OF CORRECTION

PATENT NO. : 4,787,981

DATED : November 29, 1988

INVENTOR(S) : Seiichi Tanahashi, Kaoru Nagano, Masaaki Kasai, Fujihiko Tsubone, Akio Iwama, Yoshitaka Kazuse, Kentaro Tasaka and Yutaka Isooka It is certified that error appears in the above-identified patent and that said Letters Patent is hereby corrected as shown below:

On the title page, item [73], should read

--[73] Assignee: Rinoru Oil Mills Co., Ltd.
Tokyo; Japan and

Nitto Electric Industrial Co., Ltd.
Osaka, both of Japan --

Signed and Sealed this

Twenty-sixth Day of December, 1989

*Attest:*

JEFFREY M. SAMUELS

*Attesting Officer* *Acting Commissioner of Patents and Trademarks*